US012416313B1

(12) United States Patent
Wang et al.

(10) Patent No.: US 12,416,313 B1
(45) Date of Patent: Sep. 16, 2025

(54) CENTRIFUGAL FAN

(71) Applicant: DELTA ELECTRONICS, INC., Taoyuan (TW)

(72) Inventors: Yi-Han Wang, Taoyuan (TW); Chao-Fu Yang, Taoyuan (TW); Chih-Chung Chen, Taoyuan (TW); Kuo-Tung Hsu, Taoyuan (TW); Meng-Yu Chen, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 0 days.

(21) Appl. No.: 18/823,866

(22) Filed: Sep. 4, 2024

(30) Foreign Application Priority Data

Jul. 18, 2024 (CN) ......................... 202421707778.1
Jul. 18, 2024 (CN) ......................... 202421707866.1

(51) Int. Cl.
*F04D 29/28* (2006.01)
*F04D 29/42* (2006.01)
*F04D 29/66* (2006.01)

(52) U.S. Cl.
CPC ....... *F04D 29/281* (2013.01); *F04D 29/4226* (2013.01); *F04D 29/666* (2013.01); *F05D 2250/52* (2013.01)

(58) Field of Classification Search
CPC ..... F04D 29/282; F04D 29/66; F05D 2250/61
See application file for complete search history.

(56) References Cited

U.S. PATENT DOCUMENTS 6,755,615 B2 * 6/2004 Chapman .............. F04D 29/282 415/206
9,404,502 B2 8/2016 Ishikawa
10,718,355 B2 * 7/2020 Lin ........................ F04D 29/666
11,332,052 B2 * 5/2022 Ishii ..................... F04D 29/4226
2009/0185906 A1 * 7/2009 Taylor ................... F04D 29/669 416/185
2012/0210685 A1 8/2012 Sun et al.
2013/0315724 A1 11/2013 Hsiung et al.

FOREIGN PATENT DOCUMENTS

CN 115949619 A 4/2023
JP H06249194 * 9/1994
TW I484101 B 5/2015

* cited by examiner

*Primary Examiner* — Danielle M. Christensen
(74) *Attorney, Agent, or Firm* — CKC & Partners Co., LLC

(57) ABSTRACT

A centrifugal fan includes a frame and an impeller rotatably disposed in the frame. The frame has an air inlet and an air outlet. The impeller includes a plurality of blades and an upper ring. The upper ring is connected to the blades and is located between the blades and an upper cover of the frame. The upper cover has a first annular groove and a second annular groove. The first annular groove and the second annular groove are provided on an inner surface of the upper cover and are arranged around the air inlet. The upper ring has a first annular projection and a second annular projection. The first annular projection axially extends towards the first annular groove. The second annular projection extends towards the second annular groove and is bent away from the air inlet.

18 Claims, 10 Drawing Sheets

CENTRIFUGAL FAN

RELATED APPLICATIONS

This application claims priority to China Application Serial Number 202421707689.7, 202421707778.1, 202421707925.5 and 202421707866.1, all of which were filed on Jul. 18, 2024 and are herein incorporated by reference in their entireties.

BACKGROUND

Technical Field

The present disclosure relates to a centrifugal fan.

Description of Related Art

Fans are commonly used for cooling purposes, and they more or less produce noise when operating. In particularly, fans operating at high speed often produce significant noise. Hence, how to reduce noise is an important issue in the design of fans.

SUMMARY

In view of the foregoing, one of the objects of the present disclosure is to provide a centrifugal fan with reduced noise.

To achieve the objective stated above, in accordance with an embodiment of the present disclosure, a centrifugal fan includes an upper cover, a base and an impeller. The upper cover has an air inlet, a first annular groove and a second annular groove. The first annular groove and the second annular groove are provided on an inner surface of the upper cover and are arranged around the air inlet sequentially. The base is joined with the upper cover to form a frame. An air outlet is created between outer peripheries of the upper cover and the base. The impeller is rotatably disposed in the frame and includes a plurality of blades and an upper ring. The upper ring is connected to the blades and is located between the blades and the upper cover. The upper ring is formed with a first annular projection and a second annular projection. The first annular projection axially extends towards the first annular groove. The second annular projection extends towards the second annular groove and is bent away from the air inlet.

In accordance with an embodiment of the present disclosure, a centrifugal fan includes an upper cover, a base and an impeller. The upper cover has an air inlet. The base is joined with the upper cover to form a frame. An air outlet is created between outer peripheries of the upper cover and the base. The impeller is rotatably disposed in the frame and includes a plurality of blades, an upper ring and a lower plate. The blades are connected between the upper ring and the lower plate. An air passage is formed between the upper ring, the lower plate and two adjacent blades. Two ends of the air passage face the air inlet and the air outlet, respectively. The air passage has a first axial height at a first position, a second axial height and a second position, a third axial height at a third position, and a fourth axial height at a fourth position. The first position, the second position, the third position and the fourth position are sequentially arranged from the air inlet to the air outlet. The first axial height is greater than the second axial height. The second axial height is less than the third axial height. The third axial height is greater than the fourth axial height.

In accordance with an embodiment of the present disclosure, a centrifugal fan includes an upper cover, a base and an impeller. The upper cover has an air inlet. The base is joined with the upper cover to form a frame. An air outlet is created between outer peripheries of the upper cover and the base. The impeller is rotatably disposed in the frame and includes a plurality of blades and an upper ring. The upper ring is connected to the blades and is located between the blades and the upper cover. At least one of the blades has an outer edge. The outer edge faces the air outlet and includes a rectangular sawtooth structure.

In accordance with an embodiment of the present disclosure, a centrifugal fan includes an upper cover, a base and an impeller. The upper cover has an air inlet. The base is joined with the upper cover to form a frame. An air outlet is created between outer peripheries of the upper cover and the base. The impeller is rotatably disposed in the frame and includes a plurality of blades and an upper ring. The upper ring is connected to the blades and is located between the blades and the upper cover. An inner edge of at least one of the blades is exposed at a central opening of the upper ring and the air inlet.

In one or more embodiments of the present disclosure, a gap between the upper cover and the upper ring has a variable axial height.

In one or more embodiments of the present disclosure, the variable axial height of the gap has a large-small-large or small-large-small variation pattern in an outward radial direction.

In one or more embodiments of the present disclosure, at least one of the blades has an outer edge. The outer edge faces the air outlet and includes a rectangular sawtooth structure.

In one or more embodiments of the present disclosure, the impeller further includes a lower plate. The blades are connected between the upper ring and the lower plate. An air passage is formed between the upper ring, the lower plate and two adjacent blades. Two ends of the air passage face the air inlet and the air outlet, respectively.

In one or more embodiments of the present disclosure, the upper ring has a peripheral lower surface extending radially outward from the outer edge. The lower plate has a peripheral upper surface extending radially outward from the outer edge and being substantially parallel to the peripheral lower surface of the upper ring.

In one or more embodiments of the present disclosure, the air passage has a first axial height at a first position, a second axial height and a second position, a third axial height at a third position, and a fourth axial height at a fourth position. The first position, the second position, the third position and the fourth position are sequentially arranged from the air inlet to the air outlet. The first axial height is greater than the second axial height. The second axial height is less than the third axial height. The third axial height is greater than the fourth axial height.

In one or more embodiments of the present disclosure, the third axial height is less than the first axial height, and the fourth axial height is less than the second axial height.

In one or more embodiments of the present disclosure, the upper ring has a first wavy surface facing the lower plate. The lower plate has a second wavy surface facing the upper ring. The first wavy surface and the second wavy surface create height variation across the first position, the second position, the third position and the fourth position.

In one or more embodiments of the present disclosure, an inner edge of at least one of the blades is exposed at a central opening of the upper ring and the air inlet.

In one or more embodiments of the present disclosure, the inner edge has an upper surface facing the air inlet. The upper surface of the inner edge is a planar surface, a curved surface, a sloping surface or a convex surface.

In one or more embodiments of the present disclosure, a number of the blades is eighteen or thirty-six.

In one or more embodiments of the present disclosure, the upper cover has a peripheral lower surface adjacent to the air outlet. The base has a peripheral upper surface adjacent to the air outlet and facing the peripheral lower surface of the upper cover. The peripheral lower surface of the upper cover and the peripheral upper surface of the base maintain a variable normal distance to each other. The variable normal distance has a large-small-large pattern or small-large-small variation pattern in an outward radial direction.

In one or more embodiments of the present disclosure, the upper cover and the base are connected via a plurality of connecting posts. The air outlet is formed between the upper cover, the base and the connecting posts.

In one or more embodiments of the present disclosure, a cross-section of at least one of the connecting posts has a circular, polygonal, teardrop or other convex shape.

In one or more embodiments of the present disclosure, the second annular projection includes an axially extending portion and a radially extending portion. The axially extending portion is connected between an upper surface of the upper ring and the radially extending portion.

In one or more embodiments of the present disclosure, the second annular projection is disposed on an upper surface of the upper ring. The upper surface of the upper ring has a first platform region and a second platform region. The first platform region is located between the first annular projection and the second annular projection. The second platform region is located on a side of the second annular projection away from the first annular projection. The air inlet, the first platform region and the second platform region have sequentially decreasing heights in an axial direction.

In one or more embodiments of the present disclosure, the upper surface of the upper ring further has a sloping surface or an upright surface between the first platform region and the second platform region.

In sum, the centrifugal fan of the present disclosure has reduced noise and improved efficiency by virtue of at least one of the following structural configurations: (1) the frame of the fan has two annular grooves, the impeller of the fan includes two annular projections corresponding to the two annular grooves, in which the annular projection on the outer side is bent away from the air inlet of the fan; (2) the impeller includes an upper ring, a lower plate and a plurality of blades connected between the upper ring and the lower plate, the blades divide the space between the upper ring and the lower plate into a plurality of air passages, in a direction from the air inlet to the air outlet, the air passage first contracts, and then expands, and then contracts again (i.e., the air passage contracts and expands for at least three times); (3) an outer edge of at least one of the blades includes a rectangular sawtooth structure; (4) an inner edge of at least one of the blades is exposed at the air inlet; (5) an upper surface of the inner edge is a planar surface, a curved surface, a sloping surface or a convex surface; (6) the number of the blades is eighteen or thirty-six; (7) the air outlet of the frame has a variable height with a large-small-large or small-large-small variation pattern; and (8) the upper ring and the lower plate of the impeller are connected by a plurality of connecting posts, a cross-section of at least one of the connecting posts has a circular, polygonal, teardrop or other convex shape.

BRIEF DESCRIPTION OF THE DRAWINGS

To make the objectives, features, advantages, and embodiments of the present disclosure, including those mentioned above and others, more comprehensible, descriptions of the accompanying drawings are provided as follows.

DETAILED DESCRIPTION

Figure 1:
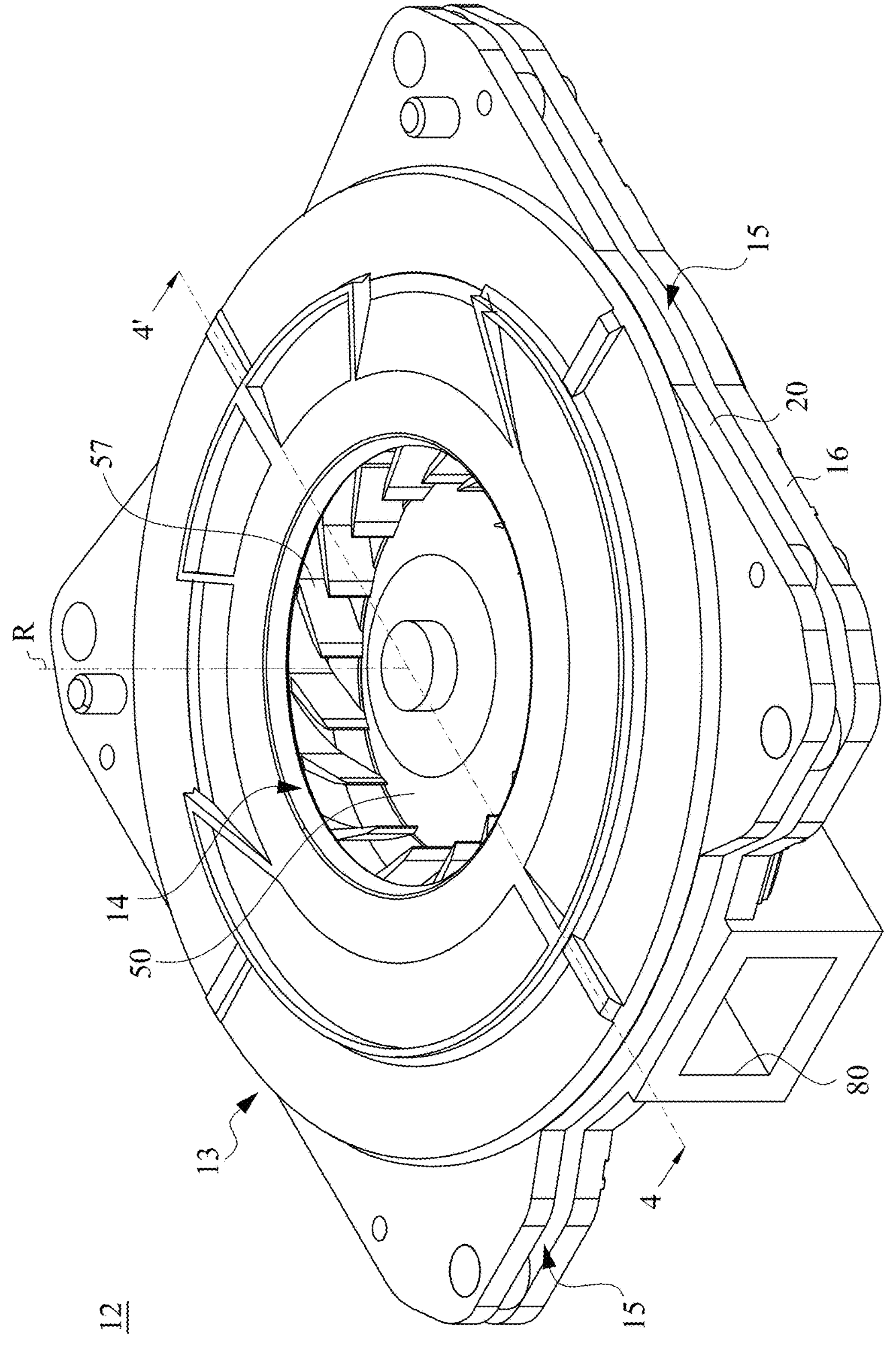
FIG. 1 illustrates an assembled view of a centrifugal fan in accordance with an embodiment of the present disclosure.

For the completeness of the description of the present disclosure, reference is made to the accompanying drawings and the various embodiments described below. Various features in the drawings are not drawn to scale and are provided for illustration purposes only. To provide full understanding of the present disclosure, various practical details will be explained in the following descriptions. However, a person with an ordinary skill in relevant art should realize that the present disclosure can be implemented without one or more of the practical details. Therefore, the present disclosure is not to be limited by these details.

Reference is made to FIG. 1. FIG. 1 illustrates an assembled view of a centrifugal fan 12 in accordance with an embodiment of the present disclosure. As shown, the centrifugal fan 12 includes a frame 13 and an impeller 50. The frame 13 has an air inlet 14 and at least one air outlet 15. The air inlet 14 is provided at a central portion of the frame 13. The air outlet 15 is provided on at least one lateral side of the frame 13. The impeller 50 is rotatably disposed in the frame 13 and is configured to rotate about a rotation axis R. When the impeller 50 is rotating, the impeller 50 can draw air into the frame 13 via the air inlet 14 and then blow air out of the frame 13 via the air outlet 15.

As shown in FIG. 1, in some embodiments, the frame 13 includes a base 16 and an upper cover 20. The base 16 is joined with the upper cover 20 to form the frame 13. The upper cover 20 has a central opening that act as the air inlet 14 of the frame 13. At least one gap is provided between the base 16 and the upper cover 20 to act as the air outlet 15. Specifically, the air outlet 15 is created between outer peripheries of the upper cover 20 and the base 16. The impeller 50 may be disposed in the space between the base 16 and the upper cover 20. The base 16 and the upper cover 20 can by combined by screwing or other suitable meanings. In some embodiments, the frame 13 further includes a connection port 80, which is, for example, an electrical connector. The connection port 80 can be connected to a system that utilizes the centrifugal fan 12 to enable the system to send control signals to the centrifugal fan 12.

Figure 2:
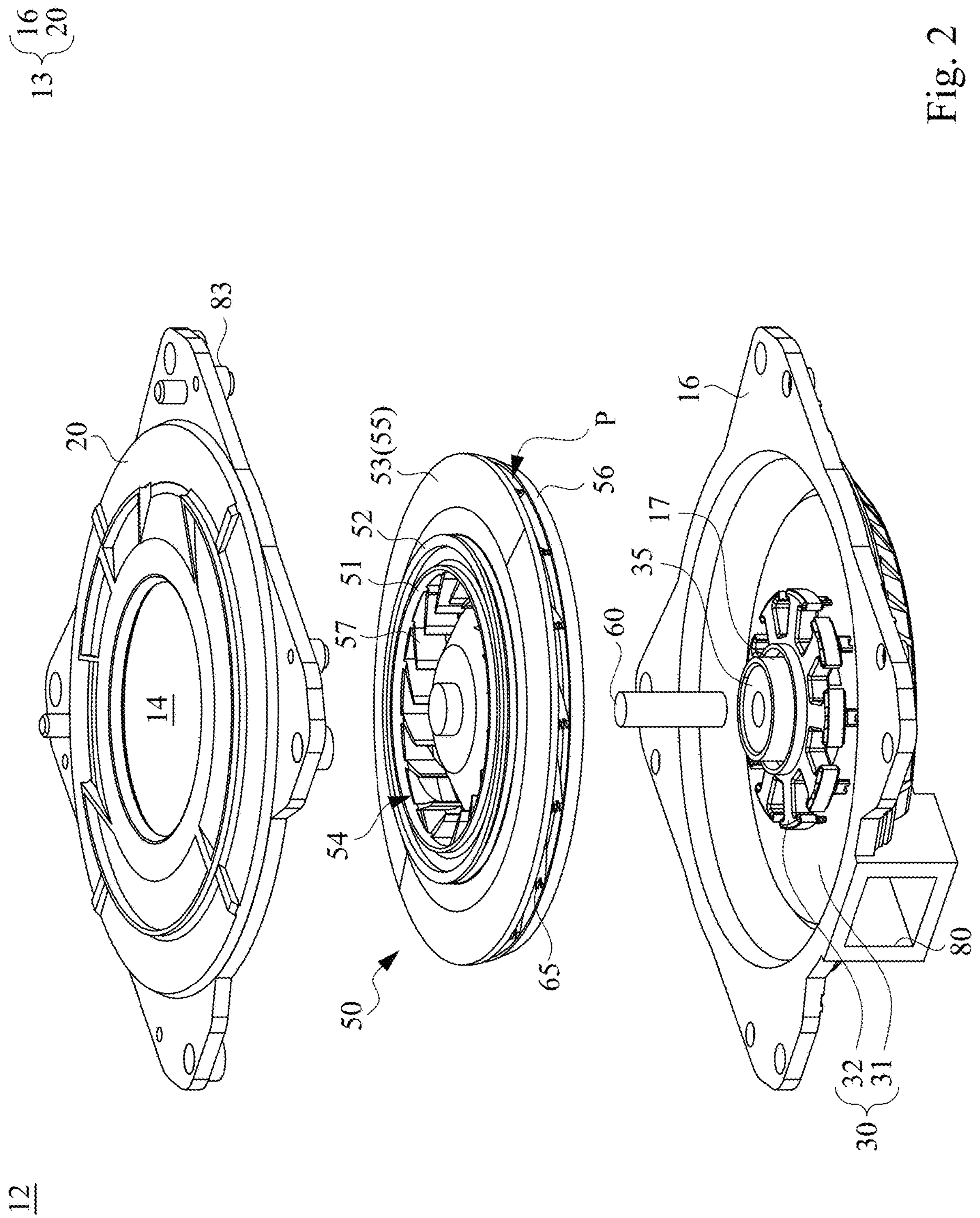
FIG. 2 illustrates an exploded view of the centrifugal fan shown in FIG. 1.

Reference is made to FIG. 2. FIG. 2 illustrates an exploded view of the centrifugal fan 12 shown in FIG. 1. As shown, the impeller 50 includes an upper ring 53, a lower plate 56 and a plurality of blades 57. The upper ring 53 and the lower plate 56 are provided on opposite sides of the impeller 50. The upper ring 53 is positioned on a side of the impeller 50 facing the upper cover 20, and the lower plate 56 is positioned on a side of the impeller 50 facing the base 16 (in other words, the lower plate 56 is positioned on a side of the impeller 50 away from the upper cover 20). The upper ring 53 has a central opening 54 facing the air inlet 14. The blades 57 are connected between the upper ring 53 and the lower plate 56, and the blades 57 divide the space between the upper ring 53 and the lower plate 56 into a plurality of air passages P. The upper cover 20 and the base 16 are connected by a plurality of connecting posts 83. The air outlet 15 is formed between the upper cover 20, the base 16 and the connecting posts 83. A cross-section of at least one of the connecting posts 83 has a circular, polygonal, teardrop or other convex shape. By this arrangement, the centrifugal fan 12 can have reduced noise and improved efficiency.

As shown in FIG. 2, each of the air passages P is formed between the upper ring 53, the lower plate 56 and two adjacent blades 57. Two ends of each air passage P face the air inlet 14 and the air outlet 15 of the frame 13, respectively. When the impeller 50 is rotating, the impeller 50 can draw air into the frame 13 and into the air passages P of the impeller 50 via the air inlet 14 and then blow air out of the frame 13 via the air outlet 15.

As shown in FIG. 2, in some embodiments, the centrifugal fan 12 further includes a stator assembly 30. The stator assembly 30 is disposed in the frame 13 and is configured to drive a rotor assembly, which includes the impeller 50, to rotate. In some embodiments, the stator assembly 30 includes a driving circuit board 31 and a coil assembly 32. The coil assembly 32 is disposed on the driving circuit board 31 and is electrically connected to the driving circuit board 31. When electric current passes through the coil assembly 32, the coil assembly 32 creates a magnetic field that can drive the rotor assembly, which includes magnets, to rotate (the magnetics are not depicted in the drawings; the magnets are, for example, disposed on an inner side of the impeller 50). In some embodiments, the coil assembly 32 may include a bobbin and a plurality of coils wound on the bobbin.

As shown in FIG. 2, the rotor assembly further includes a shaft 60. An upper end of the shaft 60 is fixedly attached to the impeller 50. The base 16 is provided with a bearing 35. The bearing 35 is coupled to the shaft 60 to support rotation motion of the rotor assembly. In some embodiments, the base 16 includes a tube 17 projecting towards the upper cover 20. The bearing 35 is disposed in the tube 17. The shaft 60 extends into the tube 17 and is inserted into a central hole of the bearing 35. In some embodiments, the driving circuit board 31 and the coil assembly 32 of the stator assembly 30 are disposed on the base 16 and surrounds the tube 17.

Figure 3:
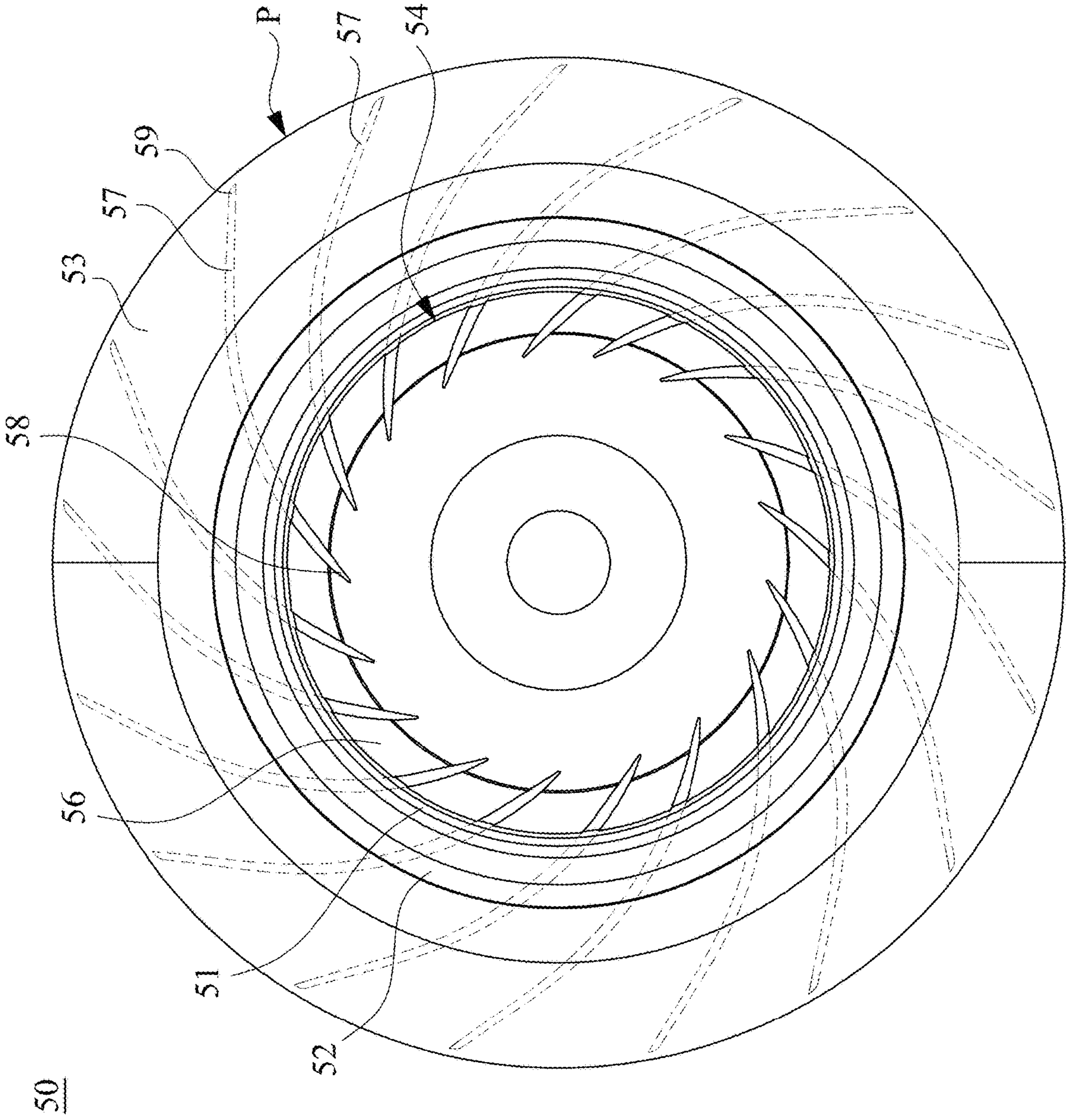
FIG. 3 illustrates a top view of the impeller of the centrifugal fan shown in FIG. 2.

Reference is made to FIG. 3. FIG. 3 illustrates a top view of the impeller 50 of the centrifugal fan 12 shown in FIG. 2. As shown, each of the blades 57 has an inner edge 58 and an outer edge 59 opposite to the inner edge 58. The inner edge 58 is adjacent to the center of the upper ring 53 and the center the lower plate 56. The outer edge 59 is adjacent to outer peripheries of the upper ring 53 and the lower plate 56, and the outer edge 59 faces the air outlet 15 of the frame 13. The inner edge 58 of at least one of the blades 57 can be exposed at the central opening 54 of the upper ring 53 and the air inlet 14 of the frame 13 (see FIG. 1). By this arrangement, the centrifugal fan 12 can have reduced noise and improved efficiency.

In some embodiments, the blades 57 have curved shapes. A number of the blades 57 is preferably eighteen or thirty-six, such that noise produced by the centrifugal fan 12 can be further reduced and the efficiency of the centrifugal fan 12 can be further improved.

Figure 4:
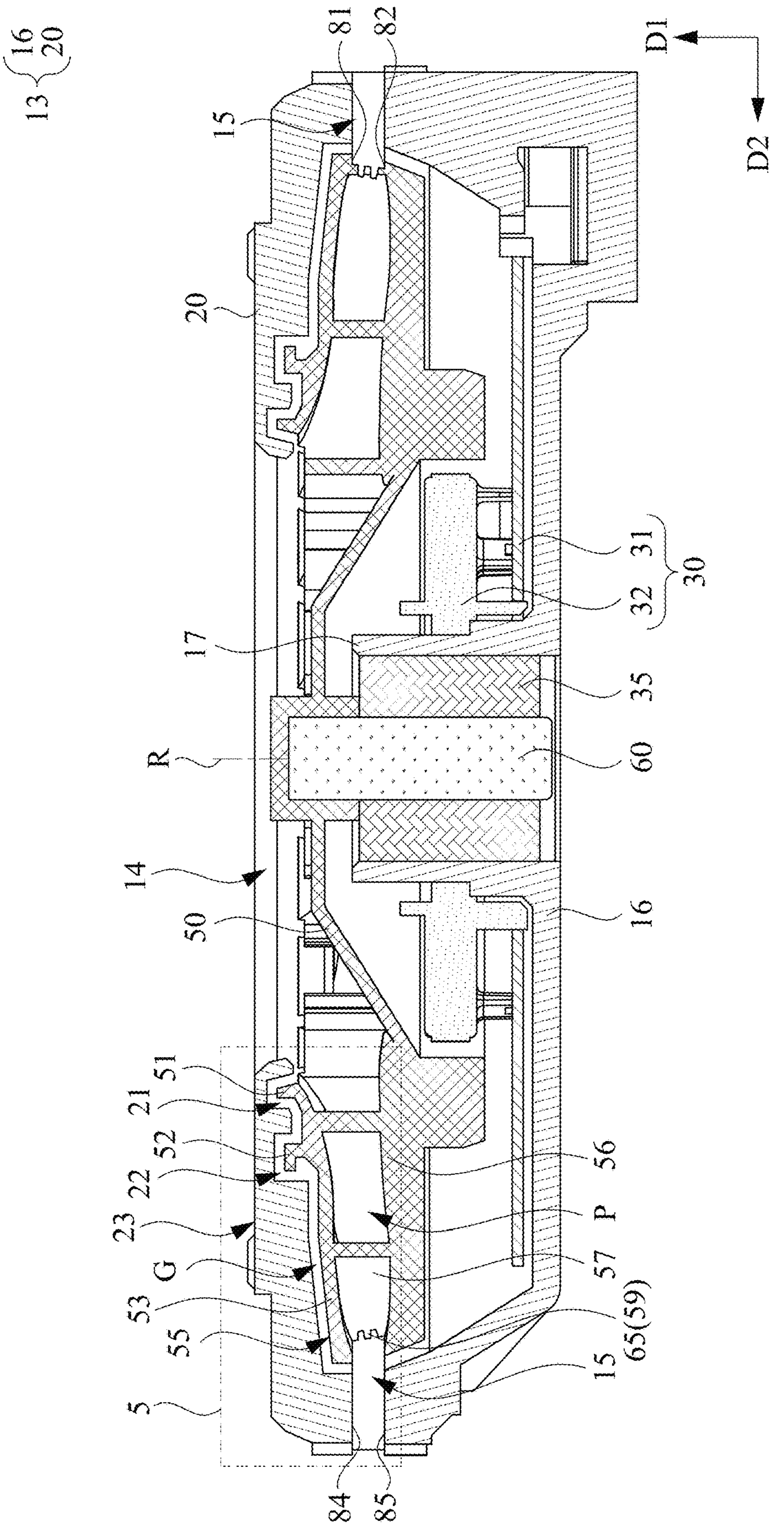
FIG. 4 illustrates a sectional view of the centrifugal fan shown in FIG. 1 taken along the line segment 4-4'.

Reference is made to FIG. 4. FIG. 4 illustrates a sectional view of the centrifugal fan 12 shown in FIG. 1 taken along the line segment 4-4'. As shown, in some embodiments, the outer edge 59 of at least one of the blades 57 includes a rectangular sawtooth structure 65 (also refer to FIG. 2). The rectangular sawtooth structure 65 includes a plurality of protruding rectangular teeth. A notch is formed between any two adjacent teeth. When the impeller 50 is rotating, the rectangular sawtooth structure 65 can break up vortices near the air outlet 15. As a result, noise produced by the centrifugal fan 12 can be reduced. In some embodiments, the rectangular sawtooth structure 65 includes at least two rectangular teeth to effectively reduce noise.

As shown in FIG. 4, the upper ring 53 has a peripheral lower surface 81 extending radially outward from the outer edge 59. The lower plate 56 has a peripheral upper surface 82 extending radially outward from the outer edge 59. In some embodiments, the peripheral upper surface 82 of the lower plate 56 is substantially parallel to the peripheral lower surface 81 of the upper ring 53. By this arrangement, the centrifugal fan 12 can have reduced noise and improved efficiency.

As shown in FIG. 4, the upper cover 20 has a peripheral lower surface 84 adjacent to the air outlet 15, and the base 16 has a peripheral upper surface 85 adjacent to the air outlet 15 and facing the peripheral lower surface 84 of the upper cover 20. In some embodiments, the peripheral lower surface 84 of the upper cover 20 and the peripheral upper surface 85 of the base 16 maintain a constant normal distance to each other. In some embodiments, the peripheral lower surface 84 of the upper cover 20 and the peripheral upper surface 85 of the base 16 are planar surfaces and are substantially parallel to each other.

Figure 5:
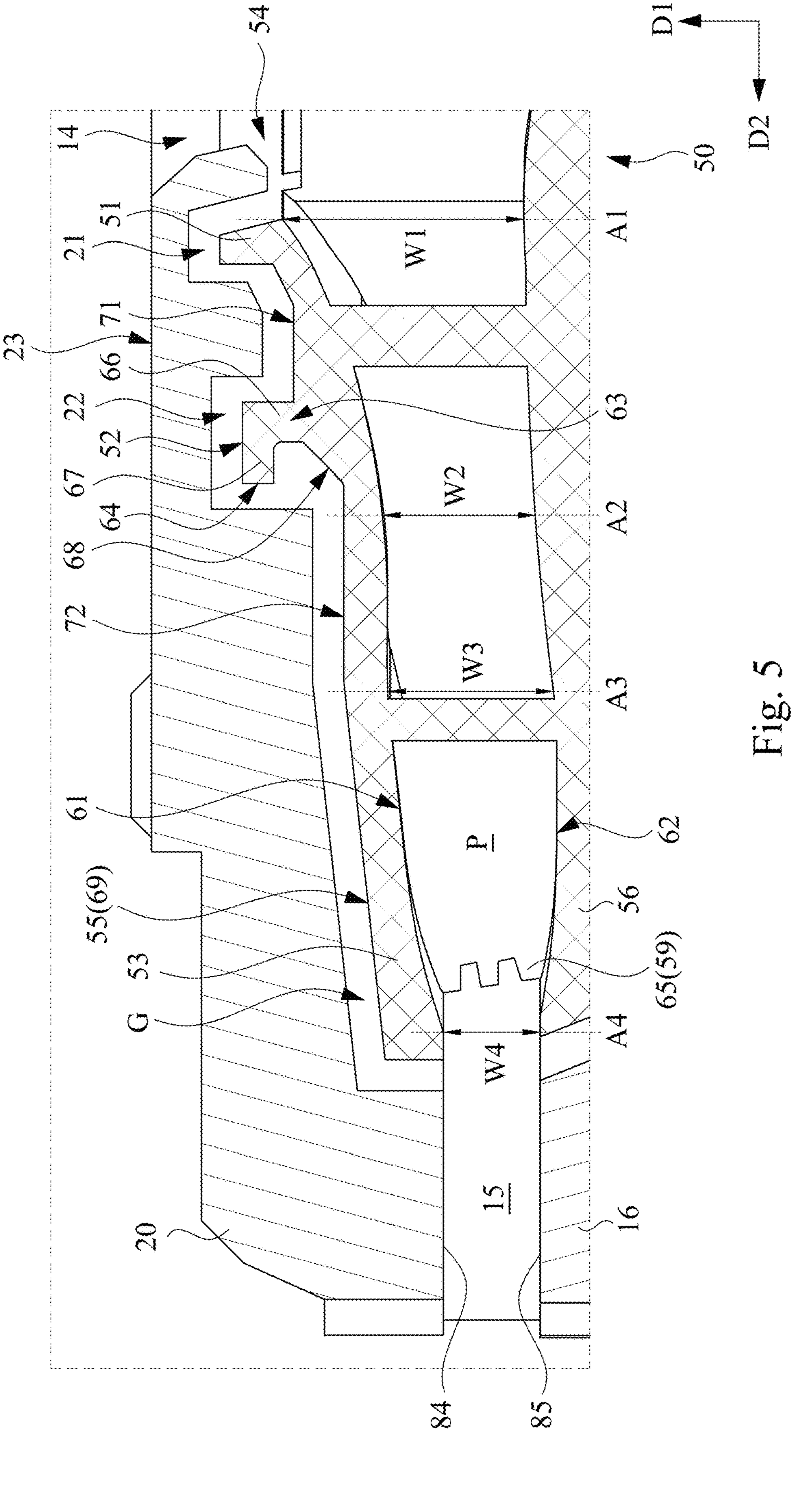
FIG. 5 illustrates an enlarged view of the centrifugal fan shown in FIG. 4 in the area identified by the dashed box 5.

Reference is made additionally to FIG. 5. FIG. 5 illustrates an enlarged view of the centrifugal fan 12 shown in FIG. 4 in the area identified by the dashed box 5. As shown in FIGS. 4 and 5, in some embodiments, the air passage P has a variable cross-sectional area. In some embodiments, the air passage P has a first axial height W1 at a first position A1, a second axial height W2 and a second position A2, a third axial height W3 at a third position A3, and a fourth axial height W4 at a fourth position A4. The first position A1, the second position A2, the third position A3 and the fourth position A4 are sequentially arranged from the air inlet 14 to the air outlet 15. The first axial height W1 is greater than the second axial height W2. The second axial height W2 is less than the third axial height W3. The third axial height W3 is greater than the fourth axial height W4. In other words, the air passage P contracts between the first position A1 and the second position A2, expands between the second position A2 and the third position A3, and contracts against between the third position A3 and the fourth position A4. In other words, in a direction from the air inlet 14 to the air outlet 15, the air passage P first becomes narrower, and then widens, and then becomes narrower again (i.e., the air passage P contracts and expands three times). With the variable cross-sectional area of the air passage P, airflow passing through the air passage P can be made more regular, and the noise produced by the centrifugal fan 12 can be reduced accordingly.

It is noted that the term "axial" used herein refers to the direction along which the rotation axis R of the impeller 50 extends (i.e., direction D1 shown in the drawings), and the term "radial" used herein refers to the direction transverse to the rotation axis R and pointing away from the rotation axis R (i.e., direction D2 shown in the drawings).

As shown in FIGS. 4 and 5, in some embodiments, the upper ring 53 has a first wavy surface 61 facing the lower plate 56 and connected to the blades 57. The lower plate 56 has a second wavy surface 62 facing the upper ring 53 and connected to the blades 57. The first wavy surface 61 and the second wavy surface 62 create height variation of the air passage P across the first position A1, the second position A2, the third position A3 and the fourth position A4. At least one peak of the first wavy surface 61 and at least one peak of the second wavy surface 62 can be aligned with each other in the axial direction. At least one trough of the first wavy surface 61 and at least one trough of the second wavy surface 62 can be aligned with each other in the axial direction.

As shown in FIGS. 4 and 5, in some embodiments, the third axial height W3 of the air passage P is less than the first axial height W1 of the air passage P, and the fourth axial height W4 of the air passage P is less than the second axial height W2 of the air passage P. In other words, between the second position A2 and the third position A3, the air passage P expands without exceeding the first axial height W1 at the first position A1.

In some embodiments, the air passage P can contract and expand for more than three times. For example, the air passage P can have a fifth axial height at a fifth position. The fifth position is between the fourth position A4 and the air outlet 15. The fifth axial height is greater than the fourth axial height W4 (i.e., the air passage P expands between the fourth position and the fifth position). For example, the air passage P can have a sixth axial height at a sixth position. The sixth position is between the fifth position and the air outlet 15. The sixth axial height is less than the fifth axial height (i.e., the air passage P contracts between the fifth position and the sixth position). And so on. In some embodiments, the fifth axial height is less than the third axial height W3. In some embodiments, the sixth axial height is less than the fourth axial height W4.

As shown in FIGS. 4 and 5, the upper ring 53 of the impeller 50 extends from the air inlet 14 to the air outlet 15. In order to allow the impeller 50 to rotate freely, the upper ring 53 does not make contact with the upper cover 20 of the frame 13 and keeps a gap G to the upper cover 20. When the centrifugal fan 12 is in operation, due to the presence of the gap G, some air enters the gap G via an end of the gap G adjacent to the air outlet 15 and creates a backflow of air.

As shown in FIGS. 4 and 5, in some embodiments, the upper cover 20 of the frame 13 includes a first annular groove 21 and a second annular groove 22. The first annular groove 21 and the second annular groove 22 are provided on an inner surface of the upper cover 20 (i.e., the surface that faces the gap G) and are arranged around the air inlet 14 sequentially (i.e., the first annular groove 21 is located between the air inlet 14 and the second annular groove 22).

As shown in FIGS. 4 and 5, in some embodiments, the upper ring 53 of the impeller 50 includes a first annular projection 51 and a second annular projection 52 (also refer to FIG. 2). The first annular projection 51 and the second annular projection 52 are disposed on an upper surface 55 of the upper ring 53 (i.e., the surface that faces the upper cover 20) and correspond to the first annular groove 21 and the second annular groove 22, respectively. The first annular projection 51 and the second annular projection 52 are arranged around the central opening 54 of the upper ring 53, and the first annular projection 51 is located between the central opening 54 and the second annular projection 52. The first annular projection 51 axially extends towards the first annular groove 21. The second annular projection 52 extends towards the second annular groove 22 and is bent away from the air inlet 14 (or bent away from the central opening 54 of the upper ring 53), such that a recess facing away from the air inlet 14 and the central opening 54 is formed between the second annular projection 52 and the upper surface 55 of the upper ring 53.

As shown in FIGS. 4 and 5, the first annular groove 21, the second annular groove 22, the first annular projection 51 and the second annular projection 52 cause the flow path of the backflow to change in both the radial direction and the axial direction. As a result, backflow in the centrifugal fan 12 is reduced, and the centrifugal fan 12 can have reduced noise and improved efficiency.

As shown in FIGS. 4 and 5, in some embodiments, the second annular projection 52 has a first end 63 and a second end 64 opposite to the first end 63. The first end 63 is connected to the upper surface 55 of the upper ring 53. The second end 64 is farther away from the upper surface 55 of the upper ring 53 as well as the rotation axis R of the impeller 50 (or the central opening 54 of the upper ring 53) than the first end 63. Consequently, the second annular projection 52, which extends from the first end 63 to the second end 64, has non-zero axial component and non-zero radial component.

As shown in FIGS. 4 and 5, in some embodiments, the second annular projection 52 includes an axially extending portion 66 and a radially extending portion 67. The axially extending portion 66 is connected between the upper surface 55 of the upper ring 53 and the radially extending portion 67. The radially extending portion 67 is substantially normal to the axially extending portion 66 and forms an L-shaped structure with the axially extending portion 66.

As shown in FIGS. 4 and 5, in some embodiments, the first annular projection 51 and the second annular projection 52 are disposed on an end of the upper ring 53 adjacent to the air inlet 14. Correspondingly, the first annular groove 21 and the second annular groove 22 are positioned adjacent to the air inlet 14. In other embodiments, the first annular projection 51 and the second annular projection 52 can be disposed on an end of the upper ring 53 adjacent to the air outlet 15. Correspondingly, the first annular groove 21 and the second annular groove 22 are positioned adjacent to the air outlet 15.

As shown in FIGS. 4 and 5, in some embodiments, the first annular projection 51 is higher than the second annular projection 52. In other words, in the axial direction, a distance from the first annular projection 51 to an upper surface 23 of the upper cover 20 (i.e., the upper surface 23 is on a side of the upper cover 20 away from the impeller 50 and the base 16) is less than a distance from the second annular projection 52 to the upper surface 23 of the upper cover 20. Correspondingly, a bottom surface of the first annular groove 21 can be at a position higher than a bottom surface of the second annular groove 22. In other words, in the axial direction, a distance from the bottom surface of the first annular groove 21 to the upper surface 23 of the upper cover 20 is less than a distance from the bottom surface of the second annular groove 22 to the upper surface 23 of the upper cover 20.

As shown in FIGS. 4 and 5, in some embodiments, the upper surface 55 of the upper ring 53 has a first platform region 71 and a second platform region 72. The first platform region 71 is located between the first annular projection 51 and the second annular projection 52. The second platform region 72 is located on a side of the second annular projection 52 away from the first annular projection 51. The second platform region 72 is at a position lower than the first platform region 71. In other words, in the axial direction, a distance from the second platform region 72 to the upper surface 23 of the upper cover 20 is greater than a distance from the first platform region 71 to the upper surface 23 of the upper cover 20. In some embodiments, the air inlet 14, the first platform region 71 and the second platform region 72 have sequentially decreasing heights in the axial direction. In other words, in the axial direction, the air inlet 14, the first platform region 71 and the second platform region 72 are at increasing distances from the upper surface 23 of the upper cover 20. Providing the first platform region 71 and the second platform region 72 with height difference can help further reduce backflow of air, and thus the noise produced by the centrifugal fan 12 can be further reduced. In the illustrated embodiment, the first platform region 71 and the second platform region 72 are substantially parallel to the direction D2. In other embodiments, the first platform region 71 and the second platform region 72 can be at an angle to the direction D2.

As shown in FIGS. 4 and 5, in some embodiments, the upper surface 55 of the upper ring 53 further has a sloping surface 68 between the first platform region 71 and the second platform region 72. In the present embodiment, the sloping surface 68 is provided on an outer side of the second annular projection 52, and the sloping surface 68 forms the recess facing away from the air inlet 14 and the central opening 54 with the second annular projection 52. In some embodiments, the upper surface 55 of the upper ring 53 further has a sloping surface 69 located between the second platform region 72 and the outer periphery of the upper ring 53.

Figure 6:
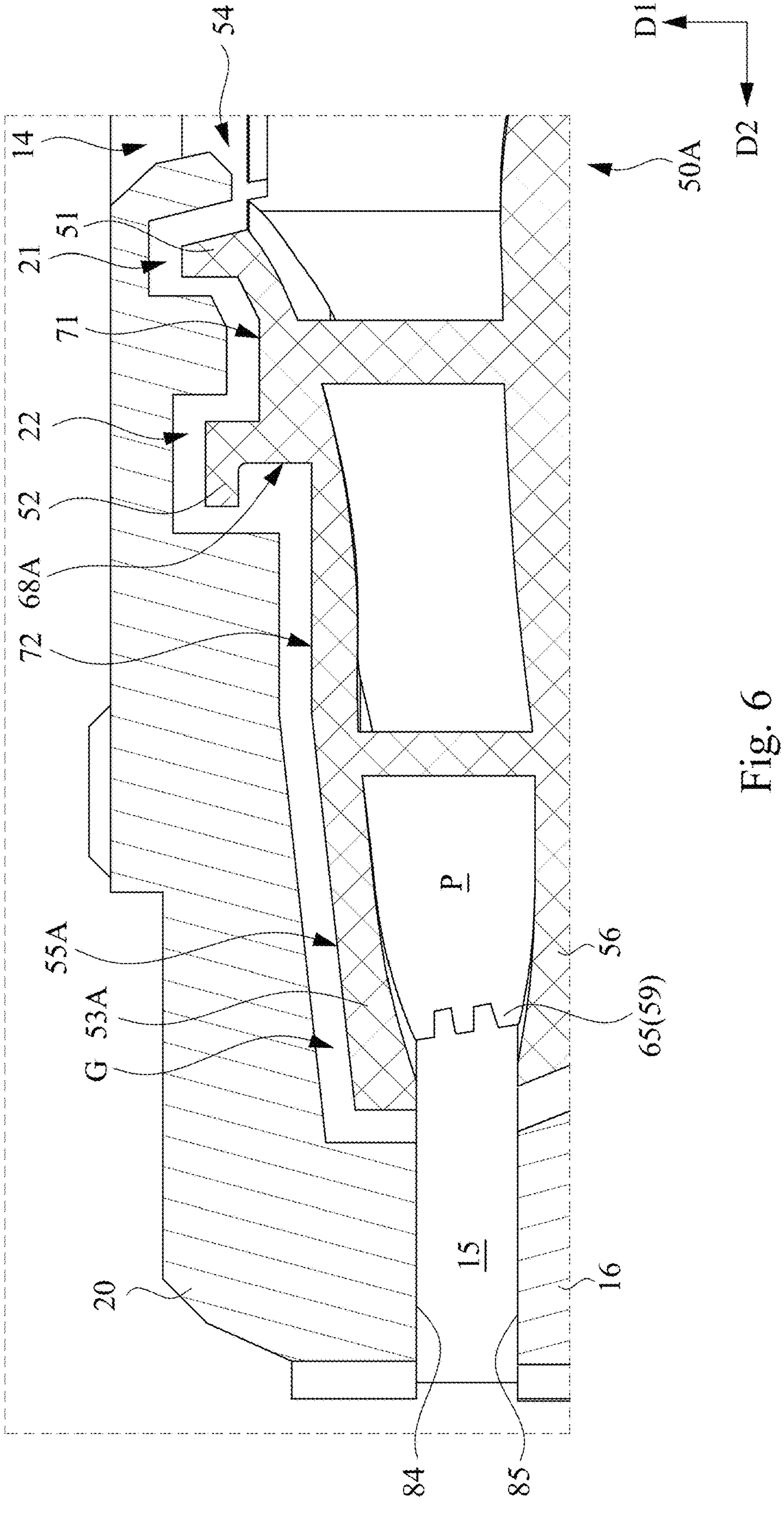
FIG. 6 illustrates a partially enlarged sectional view of a centrifugal fan in accordance with another embodiment of the present disclosure.

Reference is made to FIG. 6. FIG. 6 illustrates a partially enlarged sectional view of a centrifugal fan in accordance with another embodiment of the present disclosure. The present embodiment differs from the embodiment described above in that the upper surface 55A of the upper ring 53A of the impeller 50A has an upright surface 68A in place of the sloping surface 68 mentioned above. The upright surface 68A is connected to the first platform region 71 and the second platform region 72 having a height difference.

Figure 7:
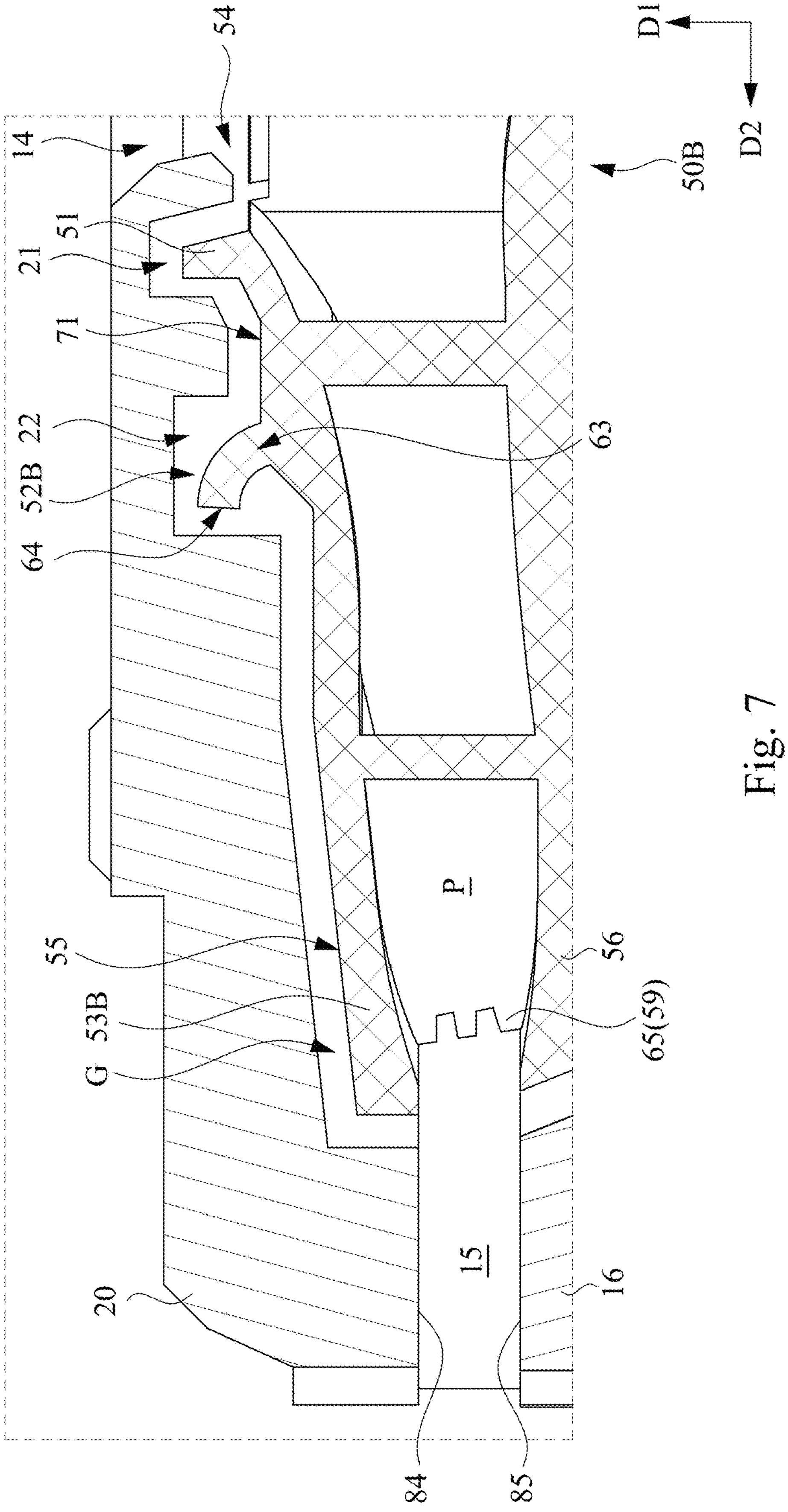
FIG. 7 illustrates a partially enlarged sectional view of a centrifugal fan in accordance with another embodiment of the present disclosure.

Reference is made to FIG. 7. FIG. 7 illustrates a partially enlarged sectional view of a centrifugal fan in accordance with another embodiment of the present disclosure. Unlike the embodiments described above, in the present embodiment, the second annular projection 52B of the upper ring 53B of the impeller 50B is an arc-shaped structure. The second annular projection 52B has a first end 63 and a second end 64 opposite to the first end 63. The first end 63 is connected to the upper surface 55 of the upper ring 53B. The second end 64 is farther away from the upper surface 55 of the upper ring 53B as well as the rotation axis of the impeller 50B (or the central opening 54 of the upper ring 53B) than the first end 63. Consequently, the second annular projection 52B, which extends from the first end 63 to the second end 64, has non-zero axial component and non-zero radial component which can help reduce the backflow of air.

Figure 8:
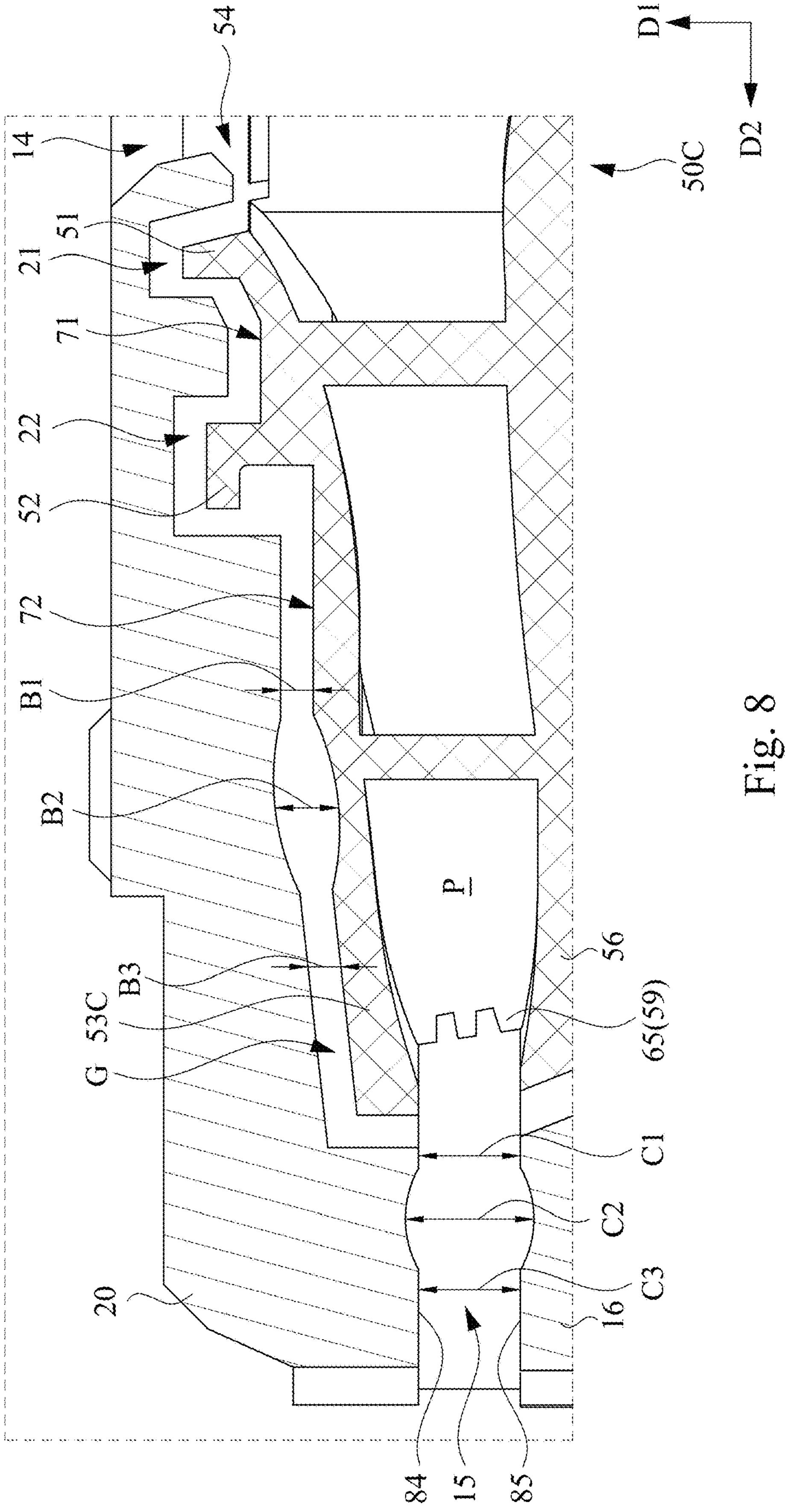
FIG. 8 illustrates a partially enlarged sectional view of a centrifugal fan in accordance with another embodiment of the present disclosure.

Reference is made to FIG. 8. FIG. 8 illustrates a partially enlarged sectional view of a centrifugal fan in accordance with another embodiment of the present disclosure. In some embodiments, the gap G between the upper cover 20 of the frame and the upper ring 53C of the impeller 50C has a variable axial height. In some embodiments, the variable axial height of the gap G has a small-large-small variation pattern in an outward radial direction (e.g., in the direction D2). In some embodiments, the gap G has a first axial height B1 at a first position, a second axial height B2 at a second position, and a third axial height B3 at a third position. The first position, the second position and the third position are sequentially arranged in the outward radial direction. The first axial height B1 is less than the second axial height B2, and the second axial height B2 is greater than the third axial height B3. By this arrangement, the centrifugal fan can have reduced noise and improved efficiency.

As shown in FIG. 8, in some embodiments, the peripheral lower surface 84 of the upper cover 20 and the peripheral upper surface 85 of the base 16 maintain a variable normal distance to each other. In some embodiments, the variable normal distance has a small-large-small variation pattern in the outward radial direction. In some embodiments, the peripheral lower surface 84 and the peripheral upper surface 85 have a first normal distance C1 at a first position, a second normal distance C2 at a second position, and a third normal distance C3 at a third position. The first position, the second position and the third position are sequentially arranged in the outward radial direction. The first normal distance C1 is less than the second normal distance C2, and the second normal distance C2 is greater than the third normal distance C3. By this arrangement, the centrifugal fan can have reduced noise and improved efficiency. In some embodiments, at least one of the peripheral lower surface 84 and the peripheral upper surface 85 may have one or more raised structures and/or recesses.

Figure 9:
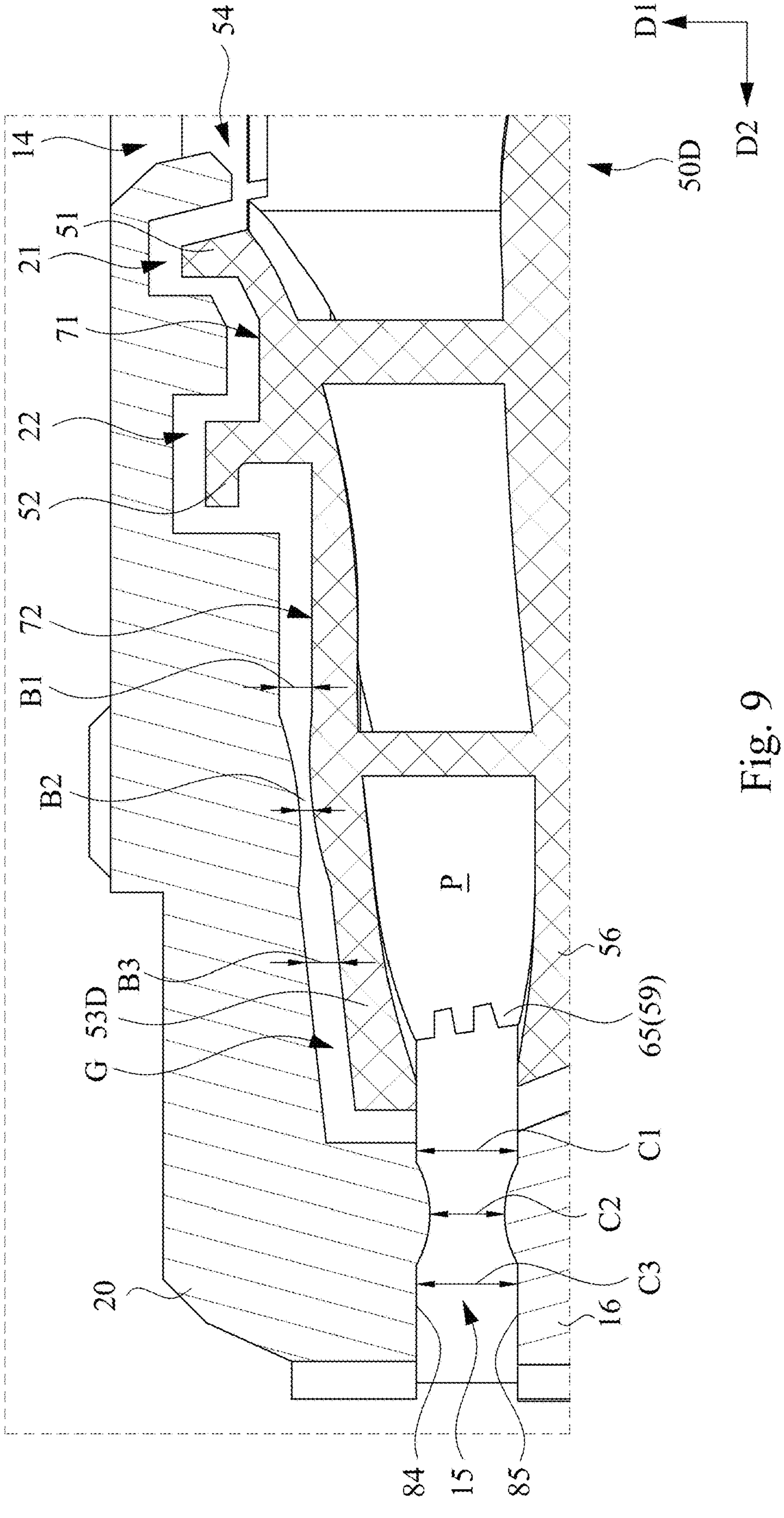
FIG. 9 illustrates a partially enlarged sectional view of a centrifugal fan in accordance with another embodiment of the present disclosure.

Reference is made to FIG. 9. FIG. 9 illustrates a partially enlarged sectional view of a centrifugal fan in accordance with another embodiment of the present disclosure. In some embodiments, the gap G between the upper cover 20 of the frame and the upper ring 53D of the impeller 50D has a variable axial height. In some embodiments, the variable axial height of the gap G has a large-small-large variation pattern in the outward radial direction (e.g., in the direction D2). In some embodiments, the gap G has a first axial height B1 at a first position, a second axial height B2 at a second position, and a third axial height B3 at a third position. The first position, the second position and the third position are sequentially arranged in the outward radial direction. The first axial height B1 is greater than the second axial height B2, and the second axial height B2 is less than the third axial height B3. By this arrangement, the centrifugal fan can have reduced noise and improved efficiency.

As shown in FIG. 9, in some embodiments, the variable normal distance between the peripheral lower surface 84 and the peripheral upper surface 85 has a large-small-large variation pattern in the outward radial direction. In some embodiments, the peripheral lower surface 84 and the peripheral upper surface 85 have a first normal distance C1 at a first position, a second normal distance C2 at a second position, and a third normal distance C3 at a third position. The first position, the second position and the third position are sequentially arranged in the outward radial direction. The first normal distance C1 is greater than the second normal distance C2, and the second normal distance C2 is less than the third normal distance C3. By this arrangement, the centrifugal fan can have reduced noise and improved efficiency.

Figure 10:
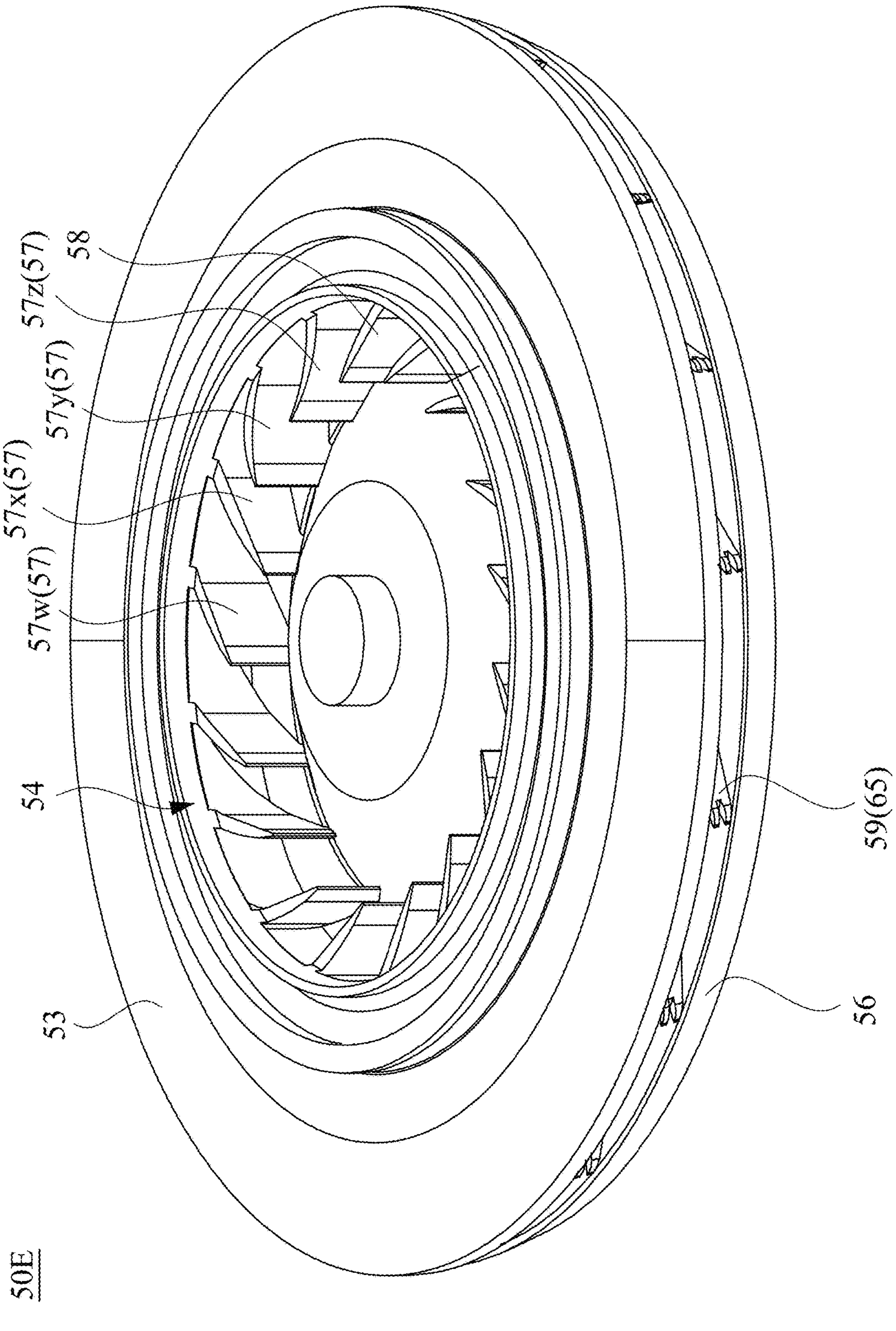
FIG. 10 illustrates an axonometric view of an impeller in accordance with another embodiment of the present disclosure.

Reference is made to FIG. 10. FIG. 10 illustrates an axonometric view of an impeller 50E in accordance with another embodiment of the present disclosure. As mentioned above, the inner edge 58 of at least one of the blades 57 is exposed at the central opening 54 of the upper ring 53 and the air inlet 14 of the frame 13 (see FIG. 1). The inner edge 58 has an upper surface facing the central opening 54 of the upper ring 53 and the air inlet 14 of the frame 13. In some embodiments, the upper surface of the inner edge 58 is a planar surface (e.g., see the blade 57*w*), a curved surface (e.g., a concave surface; see the blade 57*z*), a sloping surface (e.g., see the blade 57*x*) or a convex surface (e.g., see the blade 57*y*). By this arrangement, the centrifugal fan can have reduced noise and improved efficiency.

In accordance with an embodiment of the present disclosure, a centrifugal fan includes an upper cover, a base and an impeller. The upper cover has an air inlet. The base is joined with the upper cover to form a frame. An air outlet is created between outer peripheries of the upper cover and the base. The impeller is rotatably disposed in the frame and includes a plurality of blades, an upper ring and a lower plate. The blades are connected between the upper ring and the lower plate. An air passage is formed between the upper ring, the lower plate and two adjacent blades. Two ends of the air passage face the air inlet and the air outlet, respectively. The air passage has a first axial height at a first position, a second axial height and a second position, a third axial height at a third position, and a fourth axial height at a fourth position. The first position, the second position, the third position and the fourth position are sequentially arranged from the air inlet to the air outlet. The first axial height is greater than the second axial height. The second axial height is less than the third axial height. The third axial height is greater than the fourth axial height.

In accordance with an embodiment of the present disclosure, a centrifugal fan includes an upper cover, a base and an impeller. The upper cover has an air inlet. The base is joined with the upper cover to form a frame. An air outlet is created between outer peripheries of the upper cover and the base. The impeller is rotatably disposed in the frame and includes a plurality of blades and an upper ring. The upper ring is connected to the blades and is located between the blades and the upper cover. At least one of the blades has an outer edge. The outer edge faces the air outlet and includes a rectangular sawtooth structure.

In accordance with an embodiment of the present disclosure, a centrifugal fan includes an upper cover, a base and an impeller. The upper cover has an air inlet. The base is joined with the upper cover to form a frame. An air outlet is created between outer peripheries of the upper cover and the base. The impeller is rotatably disposed in the frame and includes a plurality of blades and an upper ring. The upper ring is connected to the blades and is located between the blades and the upper cover. An inner edge of at least one of the blades is exposed at a central opening of the upper ring and the air inlet.

In sum, the centrifugal fan of the present disclosure has reduced noise and improved efficiency by virtue of at least one of the following structural configurations: (1) the frame of the fan has two annular grooves, the impeller of the fan includes two annular projections corresponding to the two annular grooves, in which the annular projection on the outer side is bent away from the air inlet of the fan; (2) the impeller includes an upper ring, a lower plate and a plurality of blades connected between the upper ring and the lower plate, the blades divide the space between the upper ring and the lower plate into a plurality of air passages, in a direction from the air inlet to the air outlet, the air passage first contracts, and then expands, and then contracts again (i.e., the air passage contracts and expands for at least three times); (3) an outer edge of at least one of the blades includes a rectangular sawtooth structure; (4) an inner edge of at least one of the blades is exposed at the air inlet; (5) an upper surface of the inner edge is a planar surface, a curved surface, a sloping surface or a convex surface; (6) the number of the blades is eighteen or thirty-six; (7) the air outlet of the frame has a variable height with a large-small-large or small-large-small variation pattern; and (8) the upper ring and the lower plate of the impeller are connected by a plurality of connecting posts, a cross-section of at least one of the connecting posts has a circular, polygonal, teardrop or other convex shape.

Although the present disclosure has been described by way of the exemplary embodiments above, the present disclosure is not to be limited to those embodiments. Any person skilled in the art can make various changes and modifications without departing from the spirit and the scope of the present disclosure. Therefore, the protective scope of the present disclosure shall be the scope of the claims as attached.

What is claimed is:

1. A centrifugal fan, comprising:

an upper cover having an air inlet, a first annular groove and a second annular groove, wherein the first annular groove and the second annular groove are provided on an inner surface of the upper cover and are arranged around the air inlet sequentially;

a base joined with the upper cover to form a frame, wherein an air outlet is created between outer peripheries of the upper cover and the base; and an impeller rotatably disposed in the frame and comprising a plurality of blades and an upper ring, the upper ring being connected to the blades and being located between the blades and the upper cover, wherein the upper ring is formed with a first annular projection and a second annular projection, the first annular projection axially extends towards the first annular groove, the second annular projection extends towards the second annular groove and is bent away from the air inlet.

2. The centrifugal fan of claim 1, wherein a gap between the upper cover and the upper ring has a variable axial height.

3. The centrifugal fan of claim 2, wherein the variable axial height of the gap has a large-small-large or small-large-small variation pattern in an outward radial direction.

4. The centrifugal fan of claim 1, wherein at least one of the blades has an outer edge, the outer edge faces the air outlet and comprises a rectangular sawtooth structure.

5. The centrifugal fan of claim 4, wherein the impeller further comprises a lower plate, the blades are connected between the upper ring and the lower plate, wherein an air passage is formed between the upper ring, the lower plate and two adjacent ones of the blades, and two ends of the air passage face the air inlet and the air outlet, respectively.

6. The centrifugal fan of claim 5, wherein the upper ring has a peripheral lower surface extending radially outward from the outer edge, and the lower plate has a peripheral upper surface extending radially outward from the outer edge and being substantially parallel to the peripheral lower surface of the upper ring.

7. The centrifugal fan of claim 5, wherein the air passage has a first axial height at a first position, a second axial height at a second position, a third axial height at a third position, and a fourth axial height at a fourth position, the first position, the second position, the third position and the fourth position are sequentially arranged from the air inlet to the air outlet, wherein the first axial height is greater than the second axial height, the second axial height is less than the third axial height, and the third axial height is greater than the fourth axial height.

8. The centrifugal fan of claim 7, wherein the third axial height is less than the first axial height, and the fourth axial height is less than the second axial height.

9. The centrifugal fan of claim 7, wherein the upper ring has a first wavy surface facing the lower plate, the lower plate has a second wavy surface facing the upper ring, the first wavy surface and the second wavy surface create height variation across the first position, the second position, the third position and the fourth position.

10. The centrifugal fan of claim 1, wherein an inner edge of at least one of the blades is exposed at a central opening of the upper ring and the air inlet.

11. The centrifugal fan of claim 10, wherein the inner edge has an upper surface facing the air inlet, and the upper surface of the inner edge is a planar surface, a curved surface, a sloping surface or a convex surface.

12. The centrifugal fan of claim 1, wherein a number of the blades is eighteen or thirty-six.

13. The centrifugal fan of claim 1, wherein the upper cover has a peripheral lower surface adjacent to the air outlet, the base has a peripheral upper surface adjacent to the air outlet and facing the peripheral lower surface of the upper cover, wherein the peripheral lower surface of the upper cover and the peripheral upper surface of the base maintain a variable normal distance to each other, the variable normal distance has a large-small-large pattern or small-large-small variation pattern in an outward radial direction.

14. The centrifugal fan of claim 1, wherein the upper cover and the base are connected via a plurality of connecting posts, and the air outlet is formed between the upper cover, the base and the connecting posts.

15. The centrifugal fan of claim 14, wherein a cross-section of at least one of the connecting posts has a circular, polygonal, teardrop or other convex shape.

16. The centrifugal fan of claim 1, wherein the second annular projection comprises an axially extending portion and a radially extending portion, the axially extending portion is connected between an upper surface of the upper ring and the radially extending portion.

17. The centrifugal fan of claim 1, wherein the second annular projection is disposed on an upper surface of the upper ring, the upper surface of the upper ring has a first platform region and a second platform region, the first platform region is located between the first annular projection and the second annular projection, the second platform region is located on a side of the second annular projection away from the first annular projection, wherein the air inlet, the first platform region and the second platform region have sequentially decreasing heights in an axial direction.

18. The centrifugal fan of claim 17, wherein the upper surface of the upper ring further has a sloping surface or an upright surface between the first platform region and the second platform region.

* * * * *